(12) United States Patent
Kim et al.

(10) Patent No.: US 12,400,364 B2
(45) Date of Patent: Aug. 26, 2025

(54) METHOD AND DEVICE FOR GENERATING 3D MODEL THROUGH RGB-D CAMERA TRACKING

(71) Applicant: EWHA UNIVERSITY—INDUSTRY COLLABORATION FOUNDATION, Seoul (KR)

(72) Inventors: Young Jun Kim, Seoul (KR); Kyung Min Han, Seoul (KR)

(73) Assignee: EWHA UNIVERSITY—INDUSTRY COLLABORATION FOUNDATION, Seoul (KR)

( * ) Notice: Subject to any disclaimer, the term of this patent is extended or adjusted under 35 U.S.C. 154(b) by 326 days.

(21) Appl. No.: 17/928,568

(22) PCT Filed: May 26, 2021

(86) PCT No.: PCT/KR2021/006524
§ 371 (c)(1),
(2) Date: Apr. 11, 2023

(87) PCT Pub. No.: WO2021/241994
PCT Pub. Date: Dec. 2, 2021

(65) Prior Publication Data
US 2024/0135578 A1 Apr. 25, 2024

(30) Foreign Application Priority Data
May 29, 2020 (KR) .......................... 10-2020-0065244

(51) Int. Cl.
*G06T 7/73* (2017.01)
*G06T 7/13* (2017.01)
(Continued)

(52) U.S. Cl.
CPC .................. *G06T 7/74* (2017.01); *G06T 7/13* (2017.01); *G06T 7/248* (2017.01); *G06T 7/292* (2017.01);
(Continued)

(58) Field of Classification Search
CPC . G06T 2207/10016; G06T 2207/10028; G06T 2207/30244; G06T 7/579;
(Continued)

(56) References Cited

U.S. PATENT DOCUMENTS

| 8,711,206 B2 | 4/2014 | Newcombe et al. ... H04N 13/02 |
| 9,430,700 B2 | 8/2016 | Yacioglu et al. ........ G06K 9/00 |

(Continued)

FOREIGN PATENT DOCUMENTS

| KR | 10-2014-0130096 | 11/2014 | ............... G06T 7/20 |
| KR | 10-2015-0006958 | 1/2015 | ............... G06T 7/00 |

(Continued)

OTHER PUBLICATIONS

Kerl, Christian, Jürgen Sturm, and Daniel Cremers. "Dense visual SLAM for RGB-D cameras." 2013 IEEE/RSJ international conference on intelligent robots and systems. IEEE, 2013 (Year: 2013).*

(Continued)

*Primary Examiner* — Xiao M Wu
*Assistant Examiner* — Scott E Sonners
(74) *Attorney, Agent, or Firm* — HAYES SOLOWAY P.C.

(57) ABSTRACT

Disclosed are a method and device for generating a three-dimensional (3D) model through RGB-D camera tracking. A 3D model generation method may comprise the steps of: identifying RGB images and depth images; determining an initial camera pose of an RGB-D camera for each original frame of the depth images and the RGB images; determining a final camera pose for each of the original frames by updating the initial camera pose by using differences
(Continued)

between an original frame, transformed according to the initial camera pose, and remaining original frame among two consecutive original frames of the depth images and the RGB images; selecting key vertexes capable of covering all original vertexes among original vertexes; and generating a 3D model by using key-frames, corresponding to the key vertexes in the original frames of the depth images and the RGB images, and final camera poses corresponding to the key-frames.

14 Claims, 6 Drawing Sheets

(51) Int. Cl.
    *G06T 7/246*     (2017.01)
    *G06T 7/292*     (2017.01)
    *G06T 7/70*     (2017.01)
    *G06T 7/90*     (2017.01)
    *G06T 17/00*     (2006.01)

(52) U.S. Cl.
    CPC .............. *G06T 7/70* (2017.01); *G06T 7/90* (2017.01); *G06T 17/00* (2013.01); *G06T 2207/10016* (2013.01); *G06T 2207/10024* (2013.01); *G06T 2207/10028* (2013.01); *G06T 2207/30244* (2013.01)

(58) Field of Classification Search
    CPC ..... G06T 7/246; G06T 17/20; G06T 2200/08; G06T 2219/2021; G06T 7/251; G06T 7/70; G06T 17/00; G06T 7/292; G06T 7/60; G06T 7/55; G06T 7/73; G06T 2200/04; G06T 7/33; G06T 5/50; G06T 7/20; G06T 15/20; G06T 2207/20221; G06T 7/30; G06T 1/0007; G06T 7/001; G06T 7/11; G06T 7/344; G06T 7/59; G06T 7/38; G06T 2207/20; G06T 2215/16; G06T 2219/2016; G06T 5/80; G06T 7/50; G06T 7/564; G06T 7/80; G06T 2200/32; G06T 3/4038; G06T 7/254

See application file for complete search history.

(56) References Cited

U.S. PATENT DOCUMENTS

| | | | |
|---|---|---|---|
| 9,875,545 B2 | 1/2018 | Rhee et al. | G06K 9/00 |
| 10,217,234 B2 | 2/2019 | Lee et al. | G06T 9/00 |

FOREIGN PATENT DOCUMENTS

| | | | |
|---|---|---|---|
| KR | 10-1793975 | 10/2017 | H04N 13/02 |
| KR | 10-2018-0087947 | 8/2018 | G06T 17/00 |
| KR | 10-1896131 | 8/2018 | H04N 13/20 |

OTHER PUBLICATIONS

Han KM, Kim YJ. Keyslam: robust RGB-D camera tracking using adaptive VO and optimal key-frame selection. IEEE Robotics and Automation Letters. Sep. 25, 2020;5(4):6940-7 (Year: 2020).*
PCT International Search Report, Written Opinion and International Preliminary Report on Patentability dated Sep. 1, 2021, 19 pages, with translations.

* cited by examiner

METHOD AND DEVICE FOR GENERATING 3D MODEL THROUGH RGB-D CAMERA TRACKING

TECHNICAL FIELD

The present invention relates to a method and a device for generating a three-dimensional (3D) model through a tracking of an RGB-D camera and technology of performing an accurate and efficient camera tracking by estimating a camera pose and determining a key-frame by using RGB-D data obtained through an RGB-D camera.

BACKGROUND ART

Technology related to camera tracking has continuously been studied in the fields of robots or computer vision. With a development of an RGB-D camera capable of obtaining depth information from existing RGB cameras, reliability of a 3D model generated through camera tracking increased compared to when only RGB cameras were used.

Technologies frequently used for camera tracking include direct visual odometry simultaneous localization and mapping (DVO SLAM) or ORB-SLAM. However, existing technologies still have issues such as inaccurate camera pose or excessive calculations, so an efficient and accurate camera tracking technology is necessary.

DISCLOSURE OF THE INVENTION

Technical Goals

An aspect provides a method and device for performing an accurate and efficient camera tracking by estimating a camera pose and determining a key-frame by using RGB-D data obtained through an RGB-D camera.

In addition, an aspect provides a method and a device for performing an efficient camera tracking by determining a camera pose by comparing points corresponding to a same point in different frames of RGB-D data, and by selecting a key vertex among vertexes showing camera poses determined by comparing the points.

Technical Solutions

According to an aspect, a three-dimensional (3D) model generation method includes identifying RGB images and depth images acquired from an RGB-D camera, determining an initial camera pose of the RGB-D camera for each original frame of the depth images and the RGB images, determining a final camera pose for the each original frame by updating the initial camera pose by using differences between an original frame, transformed according to the initial camera pose, and remaining original frame among two consecutive original frames of the depth images and the RGB images, selecting key vertexes capable of covering all original vertexes among original vertexes corresponding to each original frame of the depth images and the RGB images, and generating a 3D model by using key-frames, corresponding to the key vertexes in the original frames of the depth images and the RGB images, and final camera poses corresponding to the key-frames.

The initial camera pose may represent a degree by which a position and an angle of the RGB-D camera changes from a viewpoint of a previous original frame to a viewpoint of a current original frame in two consecutive original frames.

The determining of the final camera pose may include determining a final camera pose by correcting the initial camera pose so that a distance between a 3D point included in the original frame, transformed according to the initial camera pose, among two consecutive original frames in the depth images and a 3D point included in a remaining original frame is minimized.

The determining of the final camera pose may include determining a final camera pose by correcting the initial camera pose so that a difference between pixel intensities included in the original frame, transformed according to the initial camera pose, among two consecutive original frames in the RGB images and pixel intensities included in a remaining original frame is minimized.

The selecting of the key vertexes may include selecting, among the original vertexes corresponding to each original frame of the depth images and the RGB images, minimum original vertexes connectable to the all original vertexes as key vertexes, through edges representing whether a visual association exists between the original frames of the depth images and the RGB images.

The 3D model generation method may further include determining original frames forming a pair of loop-closings among the original frames of the depth images and the RGB images by considering a similarity between the original frames, and updating a final camera pose based on a relative camera pose of the original frames forming the pair of loop-closings may be further included.

According to another aspect, a 3D model generation method includes identifying RGB images and depth images acquired from an RGB-D camera, determining an initial camera pose of the RGB-D camera for each original frame of the depth images and the RGB images, wherein the initial camera pose represents a degree by which a position and an angle of the RGB-D camera changes from a viewpoint of a previous original frame to a viewpoint of a current original frame in two consecutive original frames, determining, by comparing a 3D point included in a current original frame, transformed according to the initial camera pose among two consecutive original frames of the depth images to a 3D point included in a previous original frame, a first twist of a stitching of the two consecutive original frames, determining, by comparing a difference in pixel intensities between pixels included in a current original frame, transformed according to the initial camera pose among two consecutive original frames of the RGB images, and pixels included in a previous original frame, a second twist of a pixel intensity, determining a final camera pose for each original frame of the depth images and the RGB images, based on the first twist and the second twist, selecting, among original vertexes corresponding to each original frame of the depth images and the RGB images, minimum original vertexes connectable to all original vertexes as key vertexes, through edges representing whether a visual association exists between the original frames of the depth images and the RGB images, and generating a 3D model by using keyframes, corresponding to the key vertexes in the original frames of the depth images and the RGB images, and final camera poses corresponding to the key-frames.

The determining of the first twist may include updating the first twist so that a distance between 3D points of the original frame of the depth images transformed according to the initial camera pose and 3D points of the previous original frame of the depth images is minimized.

The determining of the second twist may include updating the second twist so that a difference in pixel intensities between pixels of the original frame of the RGB images transformed according to the initial camera pose and pixels of a previous original frame of the RGB images is minimized.

The 3D model generation method may further include when the key vertexes are not connected to each other through the edges, determining bridging vertexes, which enable the key vertexes among the original vertexes to be connected to each other through the edges, may be further included, wherein the generating of the 3D model may include generating a 3D model by using key-frames corresponding to the key vertexes and the bridging vertexes in the original frames of the depth images and the RGB images and a final camera pose corresponding to the key-frames.

The 3D model generation method may further include determining original frames forming a pair of loop-closings among the original frames of the depth images and the RGB images by considering a similarity between the original frames, and updating a final camera pose based on a relative camera pose of the original frames forming the pair of loop-closings may be further included.

According to another aspect, a device for generating a 3D model includes a processor, wherein the processor is configured to identify RGB images and depth images acquired from an RGB-D camera, determine an initial camera pose of the RGB-D camera for each original frame of the depth images and the RGB images, determine a final camera pose for the each original frame by updating the initial camera pose by using differences between an original frame, transformed according to the initial camera pose, and remaining original frame among two consecutive original frames of the depth images and the RGB images, select key vertexes capable of covering all original vertexes among original vertexes corresponding to each original frame of the depth images and the RGB images, and generate a 3D model by using key-frames, corresponding to the key vertexes in the original frames of the depth images and the RGB images, and final camera poses corresponding to the key-frames.

The processor may be configured to determine a final camera pose by correcting the initial camera pose so that a distance between a 3D point included in the original frame, transformed according to the initial camera pose, among two consecutive original frames in the depth images and a 3D point included in a remaining original frame is minimized.

The processor may be configured to determine a final camera pose by correcting the initial camera pose so that a difference between pixel intensities included in the original frame, transformed according to the initial camera pose, among two consecutive original frames in the RGB images and pixel intensities included in a remaining original frame is minimized.

The processor may be configured to select, among the original vertexes corresponding to each original frame of the depth images and the RGB images, minimum original vertexes connectable to the all original vertexes as key vertexes, through edges representing whether a visual association exists between the original frames of the depth images and the RGB images.

According to another aspect, a device for generating a 3D model includes a processor, wherein the processor is configured to identify RGB images and depth images acquired from an RGB-D camera, determine an initial camera pose of the RGB-D camera for each original frame of the depth images and the RGB images, determine, by comparing a 3D point included in a current original frame, transformed according to the initial camera pose among two consecutive original frames of the depth images to a 3D point included in a previous original frame, a first twist of a stitching of the two consecutive original frames, determine, by comparing a difference in pixel intensities between pixels included in a current original frame, transformed according to the initial camera pose among two consecutive original frames of the RGB images, and pixels included in a previous original frame, a second twist of a pixel intensity, determine a final camera pose for each original frame of the depth images and the RGB images, based on the first twist and the second twist, select, among original vertexes corresponding to each original frame of the depth images and the RGB images, minimum original vertexes connectable to all original vertexes as key vertexes, through edges representing whether a visual association exists between the original frames of the depth images and the RGB images, and generate a 3D model by using key-frames, corresponding to the key vertexes in the original frames of the depth images and the RGB images, and final camera poses corresponding to the key-frames, wherein the initial camera pose represents a degree by which a position and an angle of the RGB-D camera changes from a viewpoint of a previous original frame to a viewpoint of a current original frame in two consecutive original frames.

The processor may be configured to, when the key vertexes are not connected to each other through the edges, determine bridging vertexes, which enable the key vertexes among the original vertexes to be connected to each other through the edges, and generate a 3D model by using key-frames corresponding to the key vertexes and the bridging vertexes in the original frames of the depth images and the RGB images and a final camera pose corresponding to the key-frames.

The processor may be configured to determine original frames forming a pair of loop-closings among the original frames of the depth images and the RGB images by considering a similarity between the original frames, and update a final camera pose based on a relative camera pose of the original frames forming the pair of loop-closings.

Effects

According to an embodiment of the present invention, a camera pose may be estimated by using RGB-D data obtained from an RGB-D camera, and an accurate and efficient camera tracking may be performed by determining a key-frame.

In addition, according to an embodiment of the present invention, an efficient camera tracking may be performed by determining a camera pose by comparing points corresponding to a same 3D points in different frames of RGB-D, and by selecting a key vertex among vertexes showing the camera pose determined by comparing the points.

BEST MODE FOR CARRYING OUT THE INVENTION

Figure 1:
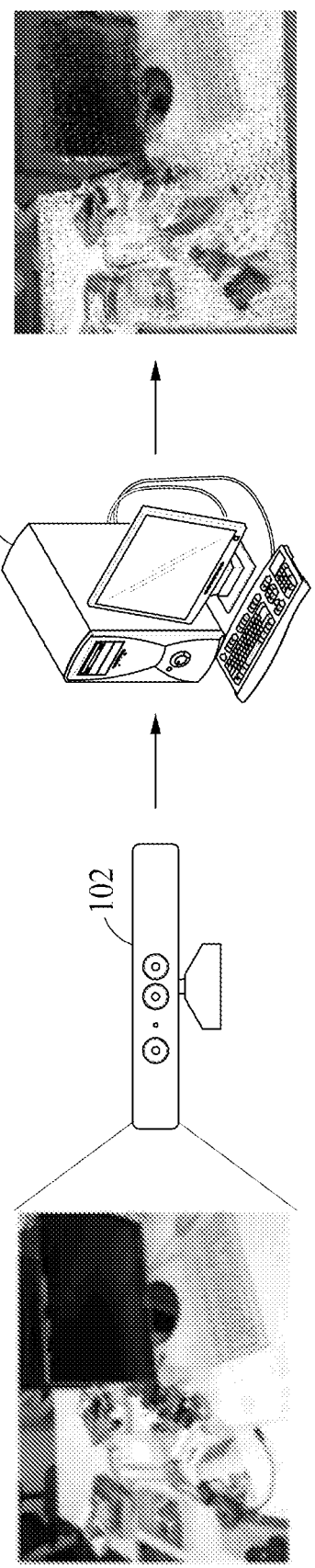
FIG. 1 is a diagram illustrating input and output objects of a device for generating a three-dimensional (3D) model according to an embodiment.

Hereinafter, embodiments will be described in detail with reference to the accompanying drawings. However, various alterations and modifications may be made to the embodiments. Here, the embodiments are not meant to be limited by the descriptions of the present disclosure. The embodiments should be understood to include all changes, equivalents, and replacements within the idea and the technical scope of the disclosure.

The terminology used herein is for the purpose of describing particular embodiments only and is not to be limiting of the embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

FIG. 1 is a diagram illustrating input and output objects of a device 101 for generating a three-dimensional (3D) model according to an embodiment.

The present invention may propose a 3D model generation method capable of performing an accurate visual odometry (hereinafter, VO) of an RGB-D camera 102 and selecting an appropriate key-frame in a sequence of an original frame and a device 101 for generating a 3D model, performing the method.

Specifically, in order to accurately perform a VO, the present invention may automatically determine a weight parameter for combining a depth map with a texture of an original frame in RGB-D data. In addition, the present invention may propose an adaptive VO for estimating a camera pose. Here, the camera pose refers to a degree by which a position and an angle of the RGB-D camera 102 changes.

In an example, a camera pose may be expressed as a 4×4 homogeneous transformation matrix. In addition, in order to select an appropriate key-frame from a sequence of an original frame, the present invention may select a key-frame by using an integer programming based on a set covering problem. In addition, the present invention may determine an optimal key-frame by generating a similarity matrix between original frames.

A 3D model generation method of the present invention may include a front-end process and a back-end process, which are processed independently. A front-end process may be a process of estimating a camera trajectory by comparing corresponding pixels between two consecutive original frames. A back-end process may be a process for processing a drift error, which accumulates in a front-end process.

A 3D model generation method may be configured with a tracking process corresponding to a front-end and an optimization process corresponding to a back-end process. In a tracking process, the device 101 for generating a 3D model may estimate a camera pose for each original frame. In contrary, in an optimization process, the device 101 for generating a 3D model may identify key-frames and correct a camera pose of the key-frames.

In addition, the device 101 for generating a 3D model may generate a 3D model, a result of a camera tracking, from a finally determined key-frame and a camera pose of the key-frame through a pose graph optimization.

Referring to FIG. 1, RGB-D data, which is input from the RGB-D camera 102, which is movable and rotatable, to the device 101 for generating a 3D model of the present invention, may be configured with RGB images and depth images. A depth image may be an image in which each of a plurality of original frames is a depth map.

The device 101 for generating a 3D model may generate a 3D model through a camera tracking from RGB-D data. Here, the device 101 for generating a 3D model may include a processor, and the processor may perform a 3D model generation method of the present invention.

Figure 2:
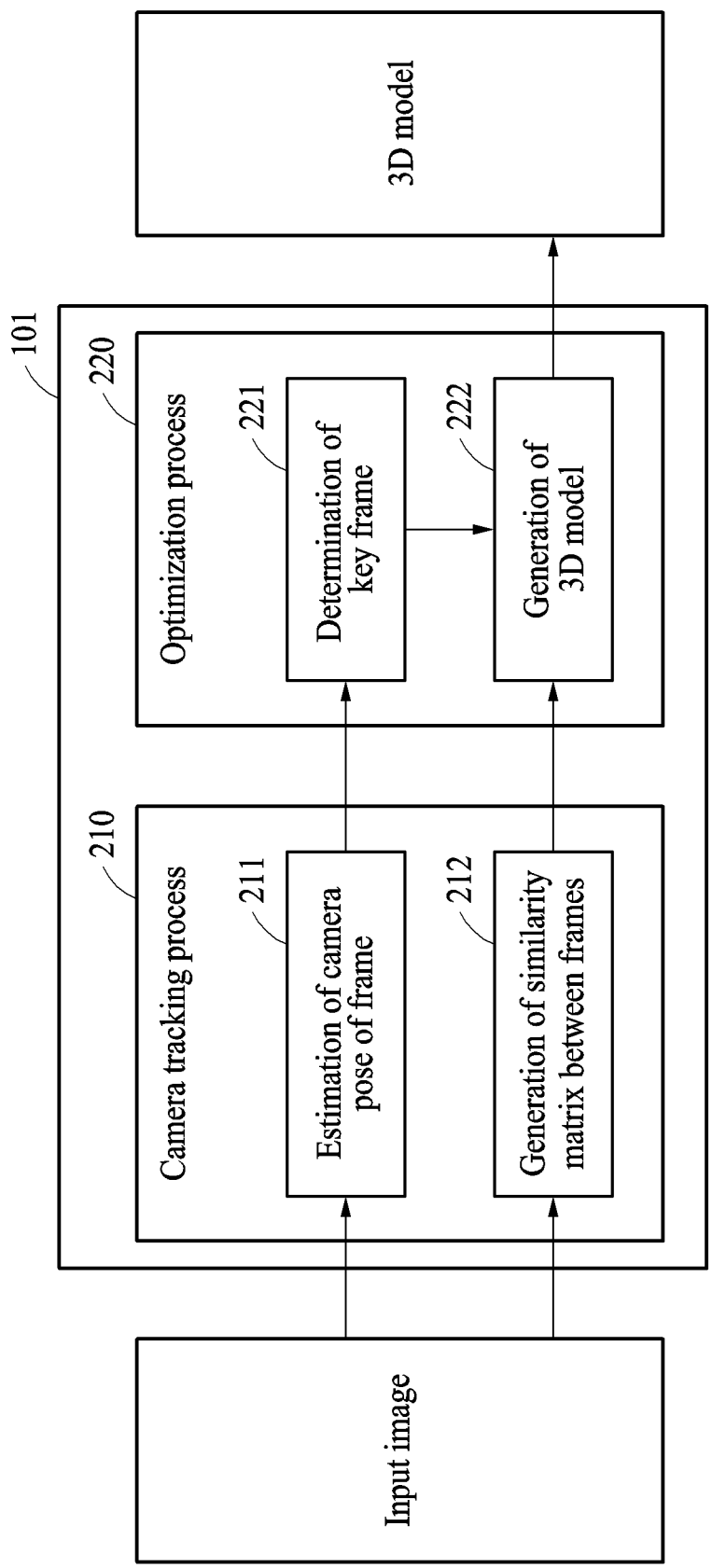
FIG. 2 is a diagram illustrating a process of generating a 3D model through a 3D model generation method according to an embodiment.

FIG. 2 is a diagram illustrating a process of generating a 3D model through a 3D model generation method according to an embodiment.

The device 101 for generating a 3D model may identify an RGB image and a depth image received from an RGB-D camera. In camera tracking process 210, the device 101 for generating a 3D model may determine an initial camera pose of an RGB-D camera for each viewpoint corresponding to each original frame of a depth image or an RGB image.

An initial camera pose may represent a degree by which a position and an angle of an RGB-D camera changes from a viewpoint of a previous original frame to a viewpoint of a current original frame. Here, the previous original frame and the current original frame may be consecutive frames, and original frames of depth images and original frames of RGB images may be configured with original frames corresponding to a same time.

In process 211, the device 101 for generating a 3D model may use a difference between two consecutive original frames in depth images and RGB images to determine a final camera pose for each original frame.

The device 101 for generating a 3D model may estimate a first twist of a stitching of two chronologically consecutive original frames by considering an iterative closed point (ICP) in a depth image. A first twist may be included in a Special Euclidean Group SE(3), represent a rigid motion of an RGB-D camera, and be expressed as a 6×1 velocity vector.

A first twist may refer to a twist determined according to an ICP, may be determined corresponding to an initial camera pose and may be updated according to a difference between two consecutive original frames. In addition, the updated first twist may be used to determine a final camera pose.

An original frame of a depth image is configured with 3D points. The device 101 for generating a 3D model may calculate a point to plane ICP residual between 3D points included in two consecutive original frames.

Specifically, the device 101 for generating a 3D model may determine a point to plane ICP residual by comparing 3D points of a current original frame transformed according to an initial camera pose determined through Equation 1 and 3D points of a previous original frame. Here, the 3D points of the current original frame and the 3D points of the previous original frame in comparison may be points pointing to a same point in a generated 3D model or a real world coordinate system.

$$\rho_k = (X_k - \exp(\zeta) C X'_k) \cdot n_k \quad \text{[Equation 1]}$$

In Equation 1, $\rho_k$ denotes: point to plane ICP residual. C denotes an arbitrarily determined initial camera pose. $\zeta$ denotes a first twist, which is included in a Special Euclidean Group SE(3), determined by an initial camera pose, and represents a rigid motion of an RGB-D camera. $n_k$ denotes a normal vector. k is for numbering a 3D point, and $X_k$ denotes a k-th 3D point of a previous original frame of a depth image. $X'_k$ denotes a 3D point corresponding to the $X_k$ in a current original frame of a depth image. exp is an exponential function. That is, as a determined initial camera pose becomes more accurate, the point to plane ICP residual may be determined more closely to 0.

The device 101 for generating a 3D model may use an iteratively running the re-weighted least square (IRLS) algorithm to determine a first twist of a stitching of two consecutive original frames of depth images. Specifically, an ICP cost function including a weight function including a predetermined weight parameter may be defined according to Equation 2 below, and a first twist, which minimizes a cost while correcting the predetermined weight parameter, is determined.

$$E_i = \min_{\xi} \sum_k \psi(\rho_k) \|\rho_k\|^2 \quad \text{[Equation 2]}$$

In Equation 2, $\psi( )$ denotes a weight function for minimizing an impact of an incorrect correspondence between 3D points and may include a weight parameter. $E_i$, which denotes an ICP cost function, is determined by updating the first twist so that a sum of point to plane ICP residuals becomes minimum. That is, in order to determine a first twist of a stitching through Equation 2, the device 101 for generating a 3D model may determine a first twist $\xi_i$, which minimizes a result of an ICP cost function.

That is, the device 101 for generating a 3D model may estimate an initial camera pose of a current original frame of a depth image and determine a first twist of a stitching between two original frames by comparing a 3D point of a current original frame transformed according to the initial camera pose to a 3D point of a previous original frame.

Specifically, the device 101 for generating a 3D model may update a first twist using an ICP cost function to minimize a distance between the 3D point of the current original frame transformed according to the initial camera pose and the corresponding 3D point of a previous original frame, and determine a first twist which minimizes the distance between the 3D point of the current original frame transformed according to the initial camera pose and the 3D point of the previous original frame.

In addition, the device 101 for generating a 3D model may determine a second twist of a pixel intensity by using a difference between pixel intensities included in a current original frame of an RGB image transformed according to an initial camera pose and pixels included in a previous original frame of the RGB image. An original frame of an RGB image may be configured with a plurality of pixels. Here, a current original frame of an RGB image and a current original frame of a depth image may be frames of an identical viewpoint.

Specifically, the device 101 for generating a 3D model may determine a second twist of a direct visual odometry (DVO) by comparing a pixel intensity between corresponding pixels between two consecutive original frames through Equation 3 below. The second twist, as a twist determined according to DVO, may be a twist of a pixel intensity. The second twist may be included in a Special Euclidean Group SE(3), represent a rigid motion of an RGB-D camera, and be expressed as a 6×1 velocity vector.

The second twist may be determined in correspondence to an initial camera pose and be updated by comparing a difference between two consecutive original frames. In addition, an updated second twist may be used to determine a final camera pose.

$$\delta_k = I_1(x_k) - I_2(x'_k) \quad \text{[Equation 3]}$$

In Equation 3, $x_k$ denotes a k-th pixel included in a previous original frame among two consecutive original frames in an RGB image. In addition, $x'_k$ denotes a k-th pixel corresponding to the $x_k$ in a current original frame of an RGB image transformed according to an initial camera pose. $\delta_k$ denotes a pixel intensity residual of the k-th pixel. $I_1(x_k)$ denotes a pixel intensity of the $x_k$ and $I_2(x'_k)$ denotes a pixel intensity of $x'_k$. The $x'_k$ may be transformed according to Equation 4.

$$x' = \pi(C, \pi^{-1}(x, Z(x))). \quad \text{[Equation 4]}$$

In Equation 4, C denotes an initial camera pose $\pi$ denotes a projection function which projects points in a 3D space to a 2D plane, and $\pi^{-1}$ denotes an inverse function of a projection function. x denotes a pixel of a current original frame of an RGB image and x' denotes a pixel included in a current original frame of an RGB image transformed according to an initial camera pose. Z(x) is a function representing depth information of the x. Depth information of x may be obtained from a current original frame of a depth image. A current original frame of a depth image and a current original frame of an RGB image represent original frames corresponding to an identical viewpoint in RGB-D data.

That is, the device 101 for generating a 3D model may transform a pixel of a 2nd original frame to 3D, transform the pixel according to an initial camera pose, and then transform the pixel to 2D again, to compare a pixel intensity of a pixel of a previous original frame to a pixel of a current original frame.

In addition, the device 101 for generating a 3D model may use an IRLS algorithm to determine a second twist of a pixel intensity of two consecutive original frames of an RGB image. Specifically, a pixel intensity cost function including a weight function including a predetermined weight parameter is defined according to Equation 5 below, and a second twist, which minimizes cost by correcting the predetermined weight parameter, is determined.

Here, the weight function used in Equations 2 and 5 is a function including an identical weight parameter. Accordingly, the device 101 for generating a 3D model may correct the weight parameter and repeatedly perform a process of updating first and second twists according to Equations 2 and 5, according to an IRLS algorithm.

$$E_d = \min_{\xi} \sum_{k} \psi(\delta_k)\|\delta_k\|^2. \quad \text{[Equation 5]}$$

In Equation 5, $\Psi(\ )$ denotes a weight function for minimizing an impact of a mismatch between pixels, where the weight function is identical to a function used to calculate the ICP cost function in Equation 2. $E_d$ denotes a pixel intensity cost function and is calculated by determining a second twist which minimizes a sum of pixel intensity residuals. The device 101 for generating a 3D model may update a second twist of a pixel intensity to determine a second twist $\hat{\xi}_d$ which minimizes a result of a pixel intensity cost function.

That is, the device 101 for generating a 3D model may determine a second twist of a pixel intensity by comparing a difference in pixel intensities between pixels included in a current original frame of an RGB image transformed according to an initial camera pose among two consecutive original frames, and pixels included in a previous original frame of the RGB image.

Specifically, the device 101 for generating a 3D model may determine a second twist, which minimizes a difference in pixel intensities between pixels included in a current original frame of an RGB image transformed according to an initial camera pose and pixels included in a previous original frame of the RGB image, by updating a second twist in a way that a difference in pixel intensities between pixels of a previous original frame and pixels of a current original frame transformed according to an initial camera pose is minimized.

In addition, the device 101 for generating a 3D model may correct a weight parameter according to an IRLS algorithm and update first and second twists according to Equations 2 and 5 to determine a final first twist and a final second twist.

Since ICP and DVO are known to show different characteristic behaviors according to a depth structure or availability of texture, the current invention may adaptively adjust a weight parameter according to relative fitness between a DVO and an ICP for every IRLS repetition procedure to reflect all different characteristic behaviors of an ICP and a DVO. Accordingly, a VO process according to the present invention may yield a more accurate and robust result.

In addition, the device 101 for generating a 3D model may perform down-sampling of a depth image and an RGB image to four pyramid levels to repeat a process above in each pyramid level, for a precise VO process. The process above refers to a process from after an initial camera pose is set to a step in which a final camera pose is determined as described below. Here, a final camera pose may be used as an initial camera pose of a next pyramid level. The device 101 for generating a 3D model may perform down-sampling in four pyramid levels to repeat the process above and thus determine an optimal camera pose for each original frame.

To determine the final camera pose, the device 101 for generating a 3D model may evaluate the quality of the first and second twists, which are determined using Equations 6 and 7.

$$e_d = \sum_{k}^{n} \|X_k - \exp(\hat{\xi}_d)X'_k\|_2 \quad \text{[Equation 6]}$$

$$e_i = \sum_{k}^{n} \|X_k - \exp(\hat{\xi}_i)X'_k\|_2 \quad \text{[Equation 7]}$$

In Equations 6 and 7, $e_d$ denotes a second evaluation parameter evaluating a second twist $\hat{\xi}_d$, and $e_i$ denotes a first evaluation parameter evaluating a first twist $\hat{\xi}_i$. $X_k$ denotes a k-th 3D point of a previous original frame of a depth image and $X'_k$ denotes a k-th 3D point corresponding to the $X_k$ in a current original frame of a depth image. exp is an exponential function.

The $e_d$ denotes a sum of differences between a D point included in a current original frame transformed according to the second twist $\hat{\xi}_d$ of a pixel intensity according to a DVO in a depth image and a 3D point of a previous original frame.

The $e_i$ denotes a sum of differences between a 3D point included in a current original frame transformed according to the first twist $\hat{\xi}_i$ of a stitching according to an ICP in a depth image and a 3D point of a previous original frame.

When the $e_i$ is greater than the $e_d$, it may mean that a first twist is determined to be closer to a twist according to an actual camera pose than a second twist, and when the $e_i$ is greater than the $e_d$, it may mean that a second twist is determined to be closer to a twist according to an actual camera pose than a first twist.

In addition, the device 101 for generating a 3D model may use a gain parameter to determine a weight between a first evaluation parameter and a second evaluation parameter. A gain parameter may be defined according to Equation 8.

$$\lambda_d = \begin{cases} \dfrac{e_i}{e_i + e_d} & \text{if } n \geq v \\ 0 & \text{if } n < v \end{cases} \quad \text{[Equation 8]}$$

In Equation 8, $\lambda_d$, a second gain parameter of a DVO, denotes a ratio of a second evaluation parameter to a sum of a first evaluation parameter and the second evaluation parameter. v denotes a number of meaningful Sobel responses in a DVO process, which determines a second twist, and v in the present invention is determined as 2% of a resolution of an original frame of a depth image.

n denotes a number of 3D points that correspond (matched) between two consecutive depth images. $\lambda_i$, a first gain parameter of an ICP, may be determined as $1-\lambda_d$. In the case of n<v, a texture in RGB-D data does not meet a certain amount, making it difficult for a DVO to properly operate, so a first twist according to an ICP may be used to determine the final camera pose.

That is, as an estimation of a camera pose according to an ICP becomes more accurate, the $e_i$ becomes less than $e_d$, so a value of a first gain parameter increases, and as an estimation of a camera pose according to a DVO becomes more accurate, $e_d$ becomes less than the $e_i$, so a value of a second gain parameter increases. Accordingly, a final camera pose may be determined by adaptively considering an estimation of a camera pose according to an ICP and an estimation of a camera pose according to a DVO. A process of determining a final camera pose by using first and second gain parameters is described below.

In addition, the device 101 for generating a 3>mod 1 may determine a final camera pose by is terpoli ting the first and second twists $\hat{\xi}_i$ and $\hat{\xi}_d$ and the first and second gain parameters $\lambda_d$ and $\lambda_d$. Specifically, the device 101 for generating a 3D model may determine a final camera pose from first and second twists and first and second gain parameters by using Equation 9.

Since original frames of a depth image and original frames of an RGB image are all captured with a same RGB-D camera and are formed of original frames of a same time interval, a final camera pose may be determined for each viewpoint of each original frame, not differently according to a depth image or an RGB image.

$$C_{avg} = \mathcal{I}(\exp(\hat{\xi}_i), \exp(\hat{\xi}_d), \lambda_i, \lambda_d) \quad \text{[Equation 9]}$$

In Equation 9, $C_{avg}$ is a final camera pose. $\mathcal{I}(\cdot)$ is an interpolation function for performing an orientation interpolation by using a quaternion Slerp and performing an interpolation of a position in an Euclidean space. A final camera pose determined through an interpolation function may be used as an initial camera pose of a next pyramid level.

In conclusion, a process of estimating a camera pose in process 211 follows the algorithm (RGBD ODOM( )) below.

| Algorithm 1: Camera pose estimation procedure |
| --- |
| 1   Function RGBDODOM( ) |
| 2   \| initialize the camera motion C; |
| 3   \| for each pyramid level do |
| 4   \| \| for each IRLS iteration do |
| 5   \| \| \| solve Eq. 2 for $\xi_d$; |
| 6   \| \| \| solve Eq. 5 for $\xi_i$; |
| 7   \| \| \| recompute $\psi(\rho)$ and $\psi(\delta)$ |
| 8   \| \| end |
| 9   \| \| compute $\lambda_i$ and $\lambda_d$ using Eq. 7 ; |
| 10  \| \| estimate $C_{avg}$ using Eq. 8 ; |
| 11  \| \| C ← $C_{avg}$ |
| 12  \| end |

The meaning of a variable used in the algorithm above is identical to the description above. However, Eq. 7 denotes Equation 8 and Eq. 8 denotes Equation 9.

In addition, in process 212, the device 101 for generating a 3D model may generate a similarity matrix showing a similarity between original frames of a depth image or an RGB image. Specifically, the device 101 for generating a 3D model may generate a similarity matrix by extracting and matching (feature extraction and matching (FEM)) features in each original frame.

The device 101 for generating a 3D model may generate a similarity matrix by matching a plurality of broad baselines of original frames of a depth image or an RGB image received from an RGB-D camera. In addition, the device 101 for generating a 3D model may use a bag of words (BoW) technique to generate a similarity matrix.

The device 101 for generating a 3D model may perform a similarity matrix generation process by a process of determining a final camera pose and an independent thread. That is, the device 101 for generating a 3D model may perform processes 211 and 212 in parallel to reduce the time consumed for camera tracking. A generated similarity matrix may be used to select an optimal key-frame.

In optimization process 220, the device 101 for generating a 3D model may determine a key-frame among original frames of a depth image or an RGB image in process 221 and generate a 3D model by using the determined key-frame in process 222.

Final camera poses corresponding to each original frame of a depth image or an RGB image may be expressed as a graph according to SLAM. A graph is configured with a set of original vertexes corresponding to each final camera pose and a set of edges representing whether a visual association exists between the original vertexes.

When $v_i$ and $v_j$ are one of the original vertexes, the $v_i$ and $v_j$ are connected by an edge $e_{ij}$. To determine whether the $v_i$ and the $v_j$ are connected by an edge, the device 101 for generating a 3D model may calculate a number of feature matchings to determine a visual association.

In process 221, the device 101 for generating a 3D model may determine minimum original vertexes for covering all original vertexes, in order to select a key-frame. The minimum original vertexes for covering all original vertexes are minimum original vertexes connectable to all original vertexes by using an edge of a graph, among all original vertexes. The device 101 for generating a 3D model may determine minimum original vertexes capable of covering all original vertexes as a set of key vertexes.

For example, when v1, v2, and v3, which are different original vertexes, are connected with each other, v4 and v5, which are different original vertexes from each of v1 to v3, are connected, and v6, which is a different original vertex from v1 to v5, has no connection relationship, a minimum set of original vertexes capable of covering all original vertexes may be one of {v1, v4, v6}, {v1, v5, v6}, {v2, v4, v6}, {v2, v5, v}, {v3, v4, v6} and {v3, v5, v}.

$$\bigcup_{V_i \in V^*} V_i = \mathbb{U}. \quad \text{[Equation 10]}$$

Equation 10 represents a set covering problem. U denotes a set of all original vertexes and $V_i$ denotes an i-th original vertex. In addition, V* denotes all original vertexes. The device 101 for generating a 3D model may i) cover all original vertexes and ii) determine a minimum set of original vertexes connectable to each other in a pose graph optimization (PGO) step as a set of key vertexes. A PGO step is described below.

Here, to select an optimized key-frame, the device 101 for generating a 3D model may determine a set of original vertexes minimizing a cost according to Equation 11 as a set of key vertexes, among many sets of original vertexes meeting the conditions i) and ii) above.

[Equation 11]

$$\min_x \sum_{x_j \in V} w_j \cdot x_j \quad (1)$$

$$\text{s.t.} \sum_j^N a_{ij} x_j \geq 1 \quad i, j = 1 \ldots N$$

$$\sum_k x_k - .r_i \geq 0 \quad k \neq i, V_k \in S_i \quad (2)$$

$$\sum_k x_k \geq c. \quad (3)$$

In Equation 11, $w_j$ is $1/|S_j|$, denotes a cost, and is an inverse cardinality of a subgroup including $v_j$. $S_j$ denotes a j-th subgroup. A subgroup may be a set including a specific original vertex and an original vertex connected with the specific original vertex by an edge. $v_j$ denotes a j-th original vertex and a specific original vertex of the $S_j$. In Equation 11, $x_j$ denotes a decision variable, which is set as 1 when the $v_j$ is selected, and set as 0 when the $v_j$ is not selected. $a_{ji}$, a binary coefficient, is set as 1 when the $v_j$ is included in an i-th subgroup.

Original vertexes which meet a condition of Equation 10, which is a condition covering all original vertexes according to (1) of Equation 11, and are not connected at all to other original vertexes by an edge according to (2) of Equation 11, are not selected. (3) of Equation 11 may be applied selectively, and minimum c number of original vertexes are selected. That is, the device 101 for generating a 3D model may use Equation 11 to select optimal key vertexes among all original vertexes.

In addition, even when a set of original vertexes selected by the device 101 for generating a 3D model meets a condition of Equation 10, which is a condition covering all original vertexes, the original vertexes may be unconnected to each other. The device 101 for generating a 3D model may add bridging vertexes to a graph so that selected key vertexes may be connected to each other.

The device 101 for generating a 3D model may determine bridging vertexes, which connect selected original vertexes by using a breadth first search (BFS). An original frame corresponding to the added bridging vertexes may be determined as a key-frame.

The device 101 for generating a 3D model may select original frames of a depth image or an RGB image corresponding to key vertexes as key-frames, and when bridging vertexes are added, may also select an original frame of a depth image or an RGB image corresponding to the added bridging vertexes as a key-frame.

In process 222, the device 101 for generating a 3D model may generate a 3D model by using the determined key-frames. Specifically, the device 101 for generating a 3D model may generate a 3D model by performing a POO using a Cere-solver with the determined key-frames.

Before generating the 3D model, the device 101 for generating a 3D model may update a final camera pose of a key-frame by using a similarity matrix, in order to optimize a final camera pose determined for each original frame of a depth image or an RGB image.

Specifically, the device 101 for generating a 3D model may determine a pair of original frames forming a pair of loop-closings with a highest similarity among original frames of a depth image or an RGB image by using the similarity matrix generated by matching the original frames of the depth image or the RGB image.

The device 101 for generating a 3D model may update the final camera pose of the key-frame by calculating a relative camera pose between final camera poses corresponding to a pair of original frames forming a pair of loop-closings.

Specifically, the device 101 for generating a 3D model may determine the relative camera pose by using Equation 12.

$$\min_{C_j} \sum_i \|x_{ji} - \pi(C_j, X_{j-1,i})\|$$ [Equation 12]

In Equation 12, $C_j$ denotes a final camera pose of a second original frame among two original frames forming a j-th pair of loop frames of a depth image or an RGB image, and $x_{ji}$ denotes an i-th pixel of a j-th original frame of an RGB image. $X_{j-1,i}$ denotes a 3D point of a first original frame among two original frames forming a pair of loop frames of a depth image corresponding to the i-th pixel above.

That is, the device 101 for generating a 3D model may determine a final camera pose considering a relative camera pose, by correcting a final camera pose so that a difference between a pixel projected in 2D by transforming a 3D point included in a second original frame among two original frames forming a pair of loop frames in a depth image according to a final camera pose and a pixel included in a first original frame among two original frames forming a pair of loop frames in an RGB image is minimized.

In order to calculate a relative camera pose, the device 101 for generating a 3D model may perform the process described below. For example, the device 101 for generating a 3D model may calculate a relative camera pose between final camera poses corresponding to a pair of original frames forming a pair of loop-closings, by using a RANSAC protocol. In addition, the device 101 for generating a 3D model may optimize a relative camera pose by performing a median absolute deviation (MAD) based on an outlier-elimination step and by performing a motion-only bundle adjustment. The device 101 for generating a 3D model may calculate $\sigma$ of a MAD, which is 1,4826 folds of an absolute deviation n of a reprojection error, from a median residual. Then, an inlier match is determined. Here, the absolute deviation $r_1$ of a reprojection error may be determined as a value less than a scale parameter $T^\sigma$, and a scale parameter in the present invention, for example, may be set as 2.5.

Figure 3:
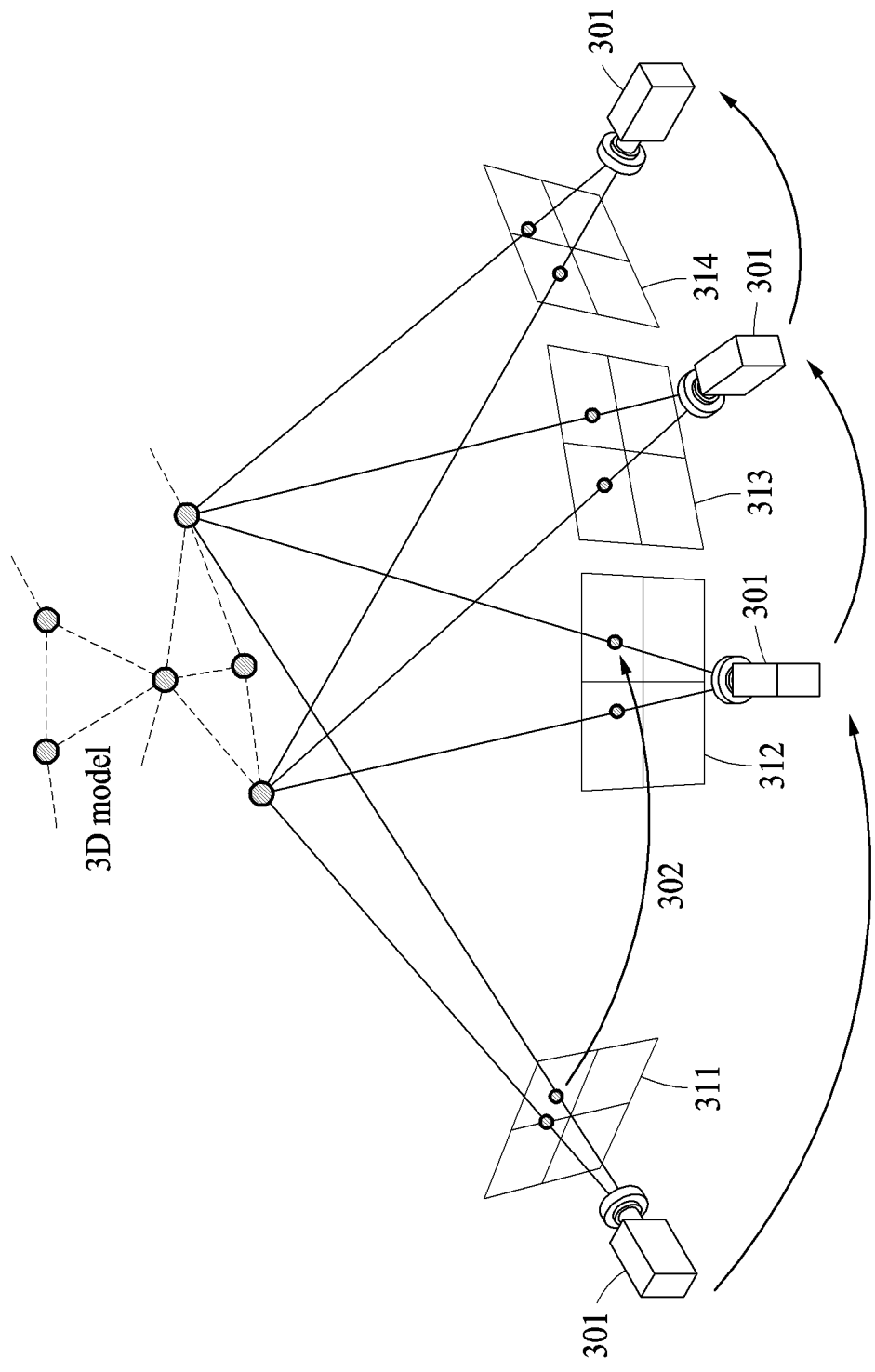
FIG. 3 is a diagram illustrating a process of generating a 3D model according to movement of an RGB-D camera according to an embodiment.

FIG. 3 is a diagram illustrating a process of generating a 3D model according to movement of an RGB-D camera according to an embodiment.

Referring to FIG. 3, an RGB-D camera may collect RGB-D data by changing an angle or a position. In addition, original frames 311, 312, 313, and 314 of a depth image or an RGB image are frames obtained from different camera poses.

However, even if the original frames 311, 312, 313, and 314 of a depth image or an RGB image have different camera poses, the original frames may include 3D points or pixels corresponding to a same point in a real world coordinate system or a 3D model. For example, referring to FIG. 3, a 3D point or a pixel 302 of the original frame 311 of a depth image or an RGB image and a 3D point or the pixel 302 of the original frame 312 with a different camera pose point to a same point in a real world coordinate system or a 3D model, so the 3D points or the pixels of the original frames 311 and 312 are in a corresponding relationship.

Therefore, as a camera pose is estimated more accurately, a 3D point or a pixel transformed according to a camera pose estimated in the current original frame 312 and the corresponding 3D point or the pixel in the previous original frame 311 become more identical.

Figure 4A:
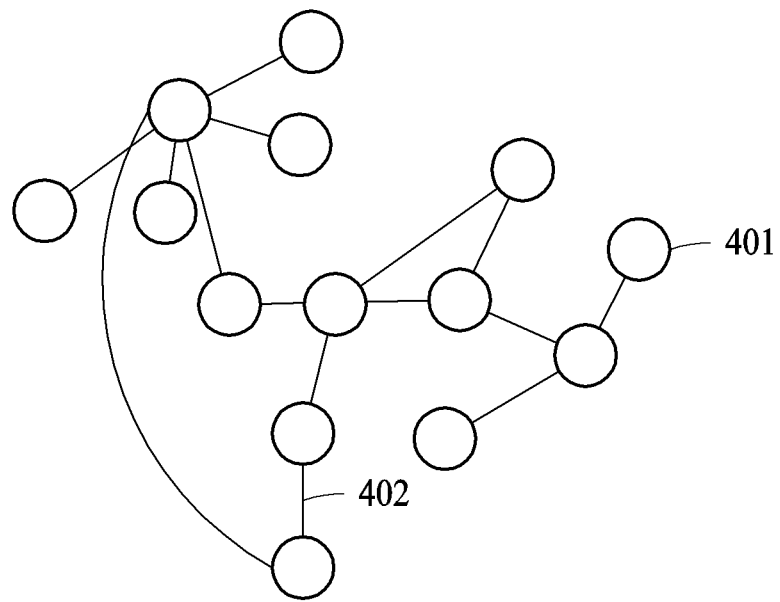
FIGS. 4A and 4B are diagrams illustrating vertexes showing a determined camera pose according to an embodiment.
Figure 4B:
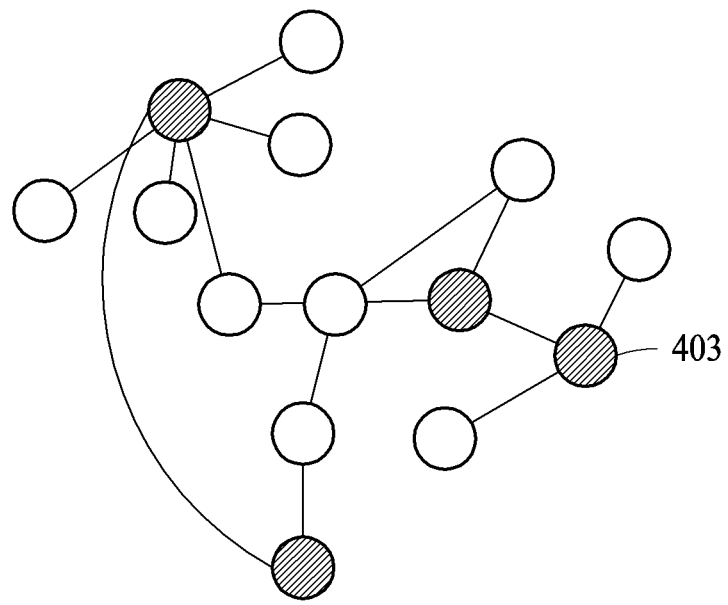

FIGS. 4A and 4B are diagrams illustrating vertexes showing a final determined camera pose according to an embodiment.

FIG. 4A is a diagram illustrating a graph including original vertexes 401 and edges 402 corresponding to each original frame based on an association relationship between original frames of a depth image or an RGB image. Original vertexes may correspond to each original frame of a depth image or an RGB image, or a final camera pose of each original frame.

In addition, FIG. 4B is a diagram illustrating selected key vertexes 403, which may cover all original vertexes according to a set covering problem, among all vertexes. With just the key vertexes 403 of FIG. 4B, connection to the original vertexes 401 is possible through edges.

A device for generating a 3D model may select key vertexes among all original vertexes according to a set covering problem and may determine an original frame corresponding to the selected key vertexes as a key-frame. In addition, the device for generating a 3D model may generate a 3D model by using key-frames.

Figure 5A:
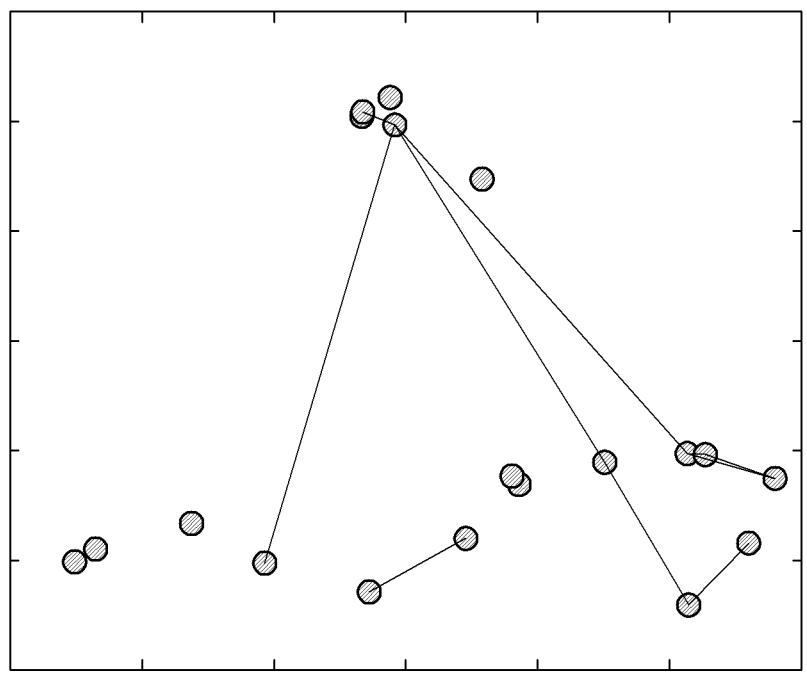
FIGS. 5A and 5B are diagrams illustrating a plurality of key vertexes and bridging vertexes connecting the plurality of key vertexes according to an embodiment.
Figure 5B:
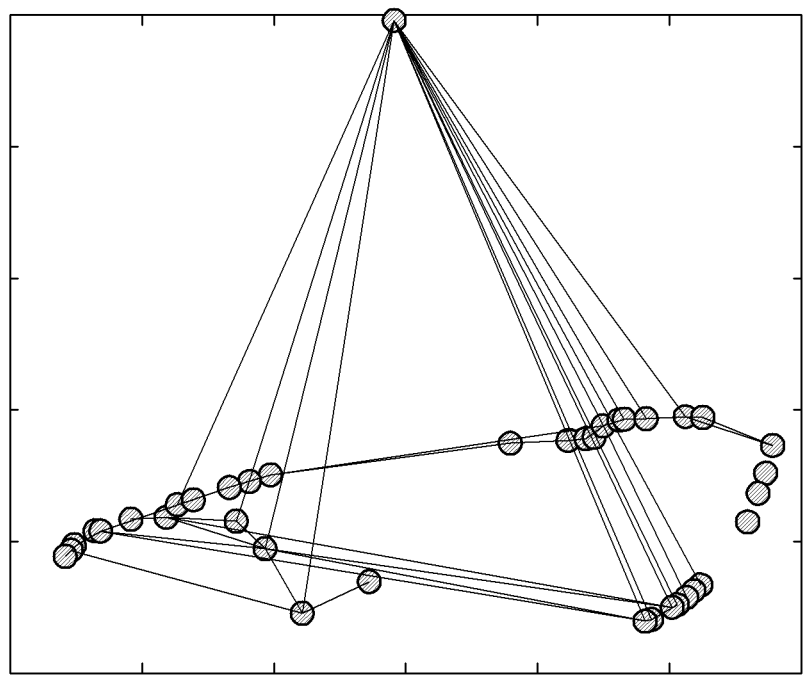

FIGS. 5A and 5B are diagrams illustrating a plurality of key vertexes and bridging vertexes connecting the plurality of key vertexes according to an embodiment.

FIG. 5A is a diagram illustrating key vertexes selected according to Equation 10, among all original vertexes. In FIG. 5A, key vertexes may cover all original vertexes according to Equation 10 but are unconnected with each other.

FIG. 5B is a diagram illustrating bridging vertexes added by using a BFS. Among unselected original vertexes illustrated in FIG. 5A, original vertexes connected by edges based on key vertexes may be determined as bridging vertexes.

Referring to FIG. 5B, by adding a bridging vertex to a key vertex, all key vertexes are connected through the bridging surface to configure one component. A device for generating a 3D model may efficiently generate a 3D model by selecting original frames corresponding to a bridging vertex and a key vertex as a key-frame.

Figure 6:
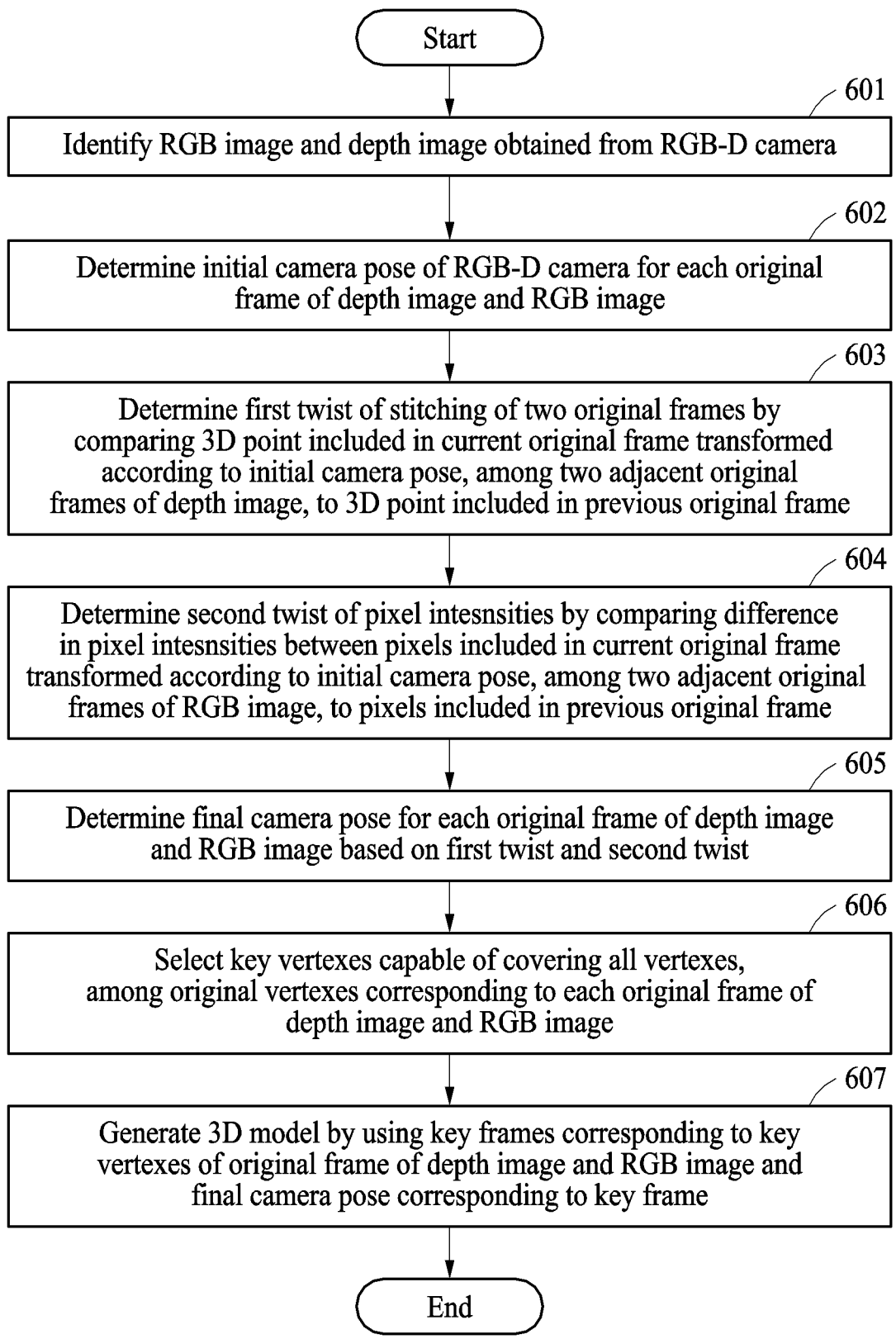
FIG. 6 is a diagram illustrating a 3D model generation method in a flowchart, according to an embodiment.

FIG. 6 is a diagram illustrating a 3D model generation method in a flowchart, according to an embodiment.

In operation 601, a device for generating a 3D model may identify an RGB image and a depth image obtained from an RGB-D camera. In operation 602, the device for generating a 3D model may determine an initial camera pose of the RGB-D camera for each original frame of the depth image and the RGB image. Here, the initial camera pose may refer to a degree by which a position and an angle of the RGB-D camera changes from a viewpoint of a previous original frame to a viewpoint of a current original frame.

In operation 603, the device for generating a 3D model may determine a first twist considering an ICP of two original frames by comparing a 3D point included in a current original frame transformed according to an initial camera pose, among the two consecutive original frames of the depth image, to a 3D point included in a previous original frame.

Specifically, the device for generating a 3D model may update the first twist so that a difference between the 3D points of the original frame of the depth image transformed according to the initial camera pose and the 3D points of the previous original frame of the depth image is minimized, by using an ICP cost function to which an IRLS algorithm is applied.

In operation 604, the device for generating a 3D model may determine a second twist of a DVO by comparing a difference in pixel intensities between pixels included in a current original frame transformed according to an initial camera pose, among two consecutive original frames of the RGB image, to pixels included in a previous original frame.

Specifically, the device for generating a 3D model may update the second twist such that the difference in the pixel intensities between the pixels included in the original frame of the RGB image transformed according to the initial camera pose and the pixels of the previous original frame of the RGB image is minimized, by using an DVO cost function to which an IRLS algorithm is applied.

In operation 605, the device for generating a 3D model may determine a final camera pose for each original frame of the depth image and the RGB image based on the first twist and the second twist. Here, the device for generating a 3D model may repeatedly perform operations 603 to 605 while down-sampling an image.

In operation 606, the device for generating a 3D model may select minimum vertexes connectable to all vertexes as key vertexes, through edges representing whether a visual association exists between the original frames of the depth image and the RGB image, among original vertexes corresponding to each original frame of the depth image and the RGB image, by using a set covering problem.

When the key vertexes are unconnected with each other through edges, the device for generating a 3D model may determine bridging vertexes, which connect key vertexes through edges, among original vertexes.

In operation 607, the device for generating a 3D model may generate a 3D model by using key-frames corresponding to the key vertexes of the original frame of the depth image and the RGB image and a final camera pose corresponding to the key-frame.

In addition, the device for generating a 3D model may determine original frames forming a pair of loop-closings by considering a similarity between original frames, among the original frames of the depth image and the RGB image, and determine a final camera pose based on a relative camera pose comparing final camera poses of original frames forming a pair of loop-closings.

The method according to embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductive wire memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific embodiments, the details should not be construed as limiting any invention or a scope that can be claimed, but rather should be construed as being descriptions of features that may be peculiar to specific embodiments of specific inventions. Specific features described in the present specification in the context of individual embodiments may be combined and implemented in a single embodiment. On the contrary, various features described in the context of a single embodiment may be implemented in a plurality of embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned embodiments is required for all the embodiments, and it should be understood that the aforementioned program components and apparatuses may be integrated into a single software product or packaged into multiple software products.

The embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed embodiments, can be made.

The invention claimed is:

1. A three-dimensional (3D) model generation method comprising:
   identifying RGB images and depth images acquired from an RGB-D camera;
   determining an initial camera pose of the RGB-D camera for each original frame of the depth images and the RGB images;
   determining a final camera pose for each original frame by updating the initial camera pose by using differences between an original frame, transformed according to the initial camera pose, and remaining original frame among two consecutive original frames of the depth images and the RGB images;
   selecting key vertexes capable of covering all original vertexes among original vertexes corresponding to each original frames of the depth images and the RGB images; and
      generating a 3D model by using key-frames, corresponding to the key vertexes in the original frames of the depth images and the RGB images, and final camera poses corresponding to the key-frames
   wherein the selecting of the key vertexes comprises selecting, among the original vertexes corresponding to each original frame of the depth images and the RGB images, minimum original vertexes connectable to the all original vertexes as key vertexes, through edges representing whether a visual association exists between the original frames of the depth images and the RGB images.

2. The 3D model generation method of claim 1, wherein the initial camera pose represents a degree by which a position and an angle of the RGB-D camera changes from a viewpoint of a previous original frame to a viewpoint of a current original frame in two adjacent-consecutive original frames.

3. The 3D model generation method of claim 1, wherein the determining of the final camera pose comprises determining a final camera pose by correcting the initial camera pose so that a distance between a 3D point included in the original frame, transformed according to the initial camera pose, among two consecutive original frames in the depth images and a 3D point included in the remaining original frame is minimized.

4. The 3D model generation method of claim 1, wherein the determining of the final camera pose comprises determining the final camera pose by correcting the initial camera pose so that a difference between pixel intensities included in the original frame, transformed according to the initial position of the camera, among two consecutive original frames in the RGB images and the pixels intensities included in the remaining original frame is minimized.

5. The 3D model generation method of claim 1, further comprising determining original frames forming a pair of loop-closings among the original frames of the depth images and the RGB images by considering similarity among the original frames, and updating the final camera pose based on a relative camera poses of the original frames forming the pair of loop-closings.

6. A non-transitory computer-readable storage medium storing instructions that, when executed by a processor, cause the processor to perform the method of claim 1.

7. A three-dimensional (3D) model generation method comprising:
   identifying RGB images and depth images acquired from an RGB-D camera;
   determining an initial camera pose of the RGB-D camera for each original frame of the depth images and the RGB images, wherein the initial camera pose represents a degree by which a position and an angle of the RGB-D camera changes from a viewpoint of a previous original frame to a viewpoint of a current original frame in two consecutive original frames;
   determining, by comparing a 3D point included in a current original frame, transformed according to the initial camera pose among two consecutive original frames of the depth images to a 3D point included in a previous original frame, a first twist of the two consecutive original frames;
   determining, by comparing a difference in pixel intensities between pixels included in a current original frame, transformed according to the initial camera pose among two consecutive original frames of the RGB images, and pixels included in a previous original frame, a second twist of a pixel intensity;
   determining a final camera pose for each original frame of the depth images and the RGB images, based on the first twist and the second twist;
   selecting, among original vertexes corresponding to each original frame of the depth images and the RGB images, minimum original vertexes connectable to all original of the vertexes as key vertexes, through edges representing whether a visual association exists between the original frames of the depth images and the RGB images; and generating a 3D model by using key-frames, corresponding to the key vertexes in the original frames of the depth images and the RGB images, and final camera poses corresponding to the key-frames.

8. The 3D model generation method of claim 7, wherein the determining of the first twist comprises updating the first twist so that a distance between 3D points of the original frame of the depth images transformed according to the initial camera pose and 3D points of the previous original frame of the depth images is minimized.

9. The 3D model generation method of claim 7, wherein the determining of the second twist comprises updating the second twist so that the difference in pixel intensities between pixels of the original frame of the RGB images transformed according to the initial camera pose and pixels of a previous original frame of the RGB images is minimized.

10. The 3D model generation method of claim 7 further comprising, when the key vertexes are not connected to each other through the edge, determining bridging vertexes, which enable the key vertexes among the original vertexes to be connected to each other through the edge, wherein the generating of the 3D model comprises generating a 3D model by using key-frames corresponding to the key vertexes and the bridging vertexes in the original frames of the depth images and the RGB images and a final camera pose corresponding to the key-frames.

11. The 3D model generation method of claim 7, further comprising determining original frames forming a pair of loop-closings among the original frames of the depth images and the RGB images by considering a similarity between the original frames, and updating a final camera pose based on a relative camera pose of the original frames forming the pair of loop-closings.

12. A device for generating a three-dimensional (3D) model, the device comprising a processor, wherein the processor is configured to:

identify RGB images and depth images acquired from an RGB-D camera;

determine an initial camera pose of the RGB-D camera for each original frame of the depth images and the RGB images;

determine a final camera pose for the each original frame by updating the initial camera pose by using differences between an original frame, transformed according to the initial camera pose, and remaining original frame among two consecutive original frames of the depth images and the RGB images;

select key vertexes capable of covering all original vertexes among original vertexes corresponding to each original frames of the depth images and the RGB images; and generate a 3D model by using key-frames, corresponding to the key vertexes in the original frames of the depth images and the RGB images, and final camera poses corresponding to the key-frames wherein to select key vertexes comprises selecting, among the original vertexes corresponding to each original frame of the depth images and the RGB images, minimum original vertexes connectable to the all original vertexes as key vertexes, through edges representing whether a visual association exists between the original frames of the depth images and the RGB images.

13. The device of claim 12, wherein the processor is configured to determine a final camera pose by correcting the initial camera pose so that a distance between a 3D point included in the original frame, transformed according to the initial camera pose, among two consecutive original frames in the depth images and a 3D point included in a remaining original frame is minimized.

14. The device of claim 12, wherein the processor is configured to determine the final camera pose by correcting the initial camera pose so that a difference between pixels intensities included in the original frame, transformed according to the initial camera pose, among two consecutive original frames in the RGB images and pixels intensities included in the remaining original frame is minimized.

* * * * *